Feb. 2, 1954
R. C. CASTLEN
2,668,185
VISIBLE LIQUID LEVEL INDICATING NONSPILL VENT MECHANISMS
Filed Nov. 20, 1950
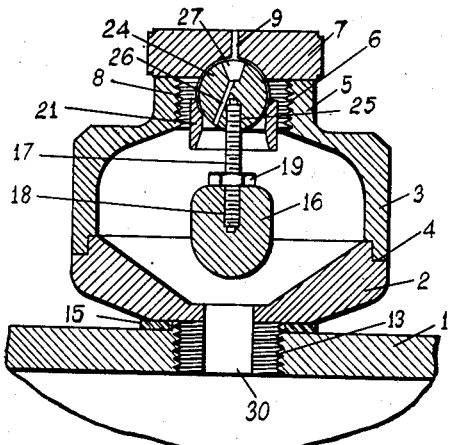
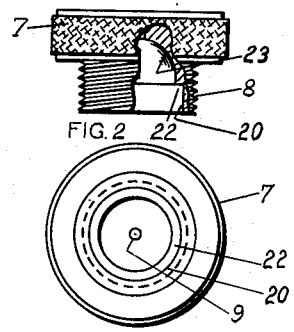
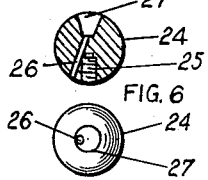
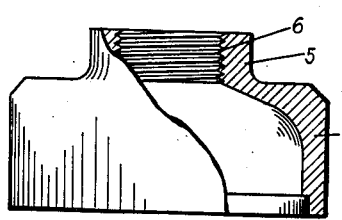
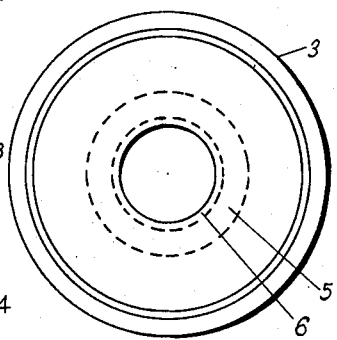
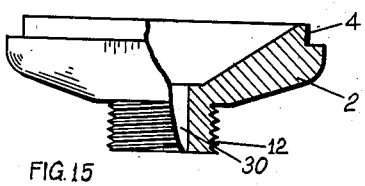
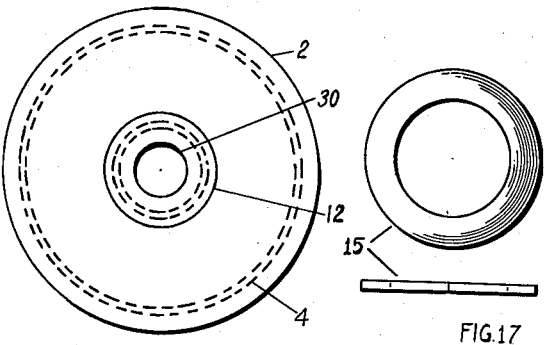
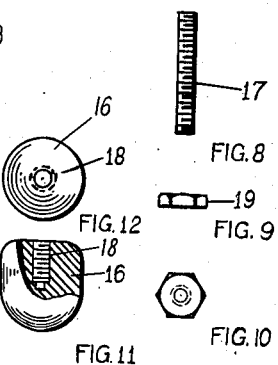
INVENTOR.
Robert Cecil Castlen
BY Patented Feb. 2, 1954

2,668,185

UNITED STATES PATENT OFFICE 2,668,185

VISIBLE LIQUID LEVEL INDICATING NONSPILL VENT MECHANISMS

Robert Cecil Castlen, West Palm Beach, Fla.

Application November 20, 1950, Serial No. 196,609

6 Claims. (Cl. 136—178)

1

This invention relates to visible liquid level indicators and non-spill vent means for storage batteries.

Among the objects and advantages of this invention, there may be mentioned the provision of readily visible means of determining whether or not the liquid level in any cell of a storage battery is at proper level, simplified and automatic means for adding fluid to a battery cell, a void space to accommodate displaced cell fluid due to heat expansion, and/or the provision of non-spill vent mechanism for the battery cells, and particularly pendulum actuated mechanism for controlling the non-spill vent valve means.

The foregoing and other objects and advantages of this invention are attained by the novel construction and arrangement of a limited number of pendulum and ball-and-socket valve parts of simple and inexpensive design, to provide the durable and efficient device hereinafter more fully described.

In the accompanying sheet of drawings, wherein like members are given the same reference numeral throughout, Fig. 1 is a vertical cross-sectional view of the device of this invention shown in operable position on a storage battery cell;

Fig. 2 is a side elevation view, partly shown in fragment, of the vent cap of the device;

Fig. 3 is a bottom elevation view of the vent cap in Fig. 2;

Fig. 4 is a side elevation view, partly shown in fragment, of the retaining sleeve constructed to fit in said vent cap;

Fig. 5 is a plan view of the vent mechanism retaining sleeve of Fig. 4;

Fig. 6 is a vertical cross-sectional view of the vent valve;

Fig. 7 is a plan view of the vent valve of Fig. 6;

Fig. 8 is a side elevation view of the threaded adjusting pendulum arm;

Fig. 9 is a side elevation of the pendulum arm locking nut;

Fig. 10 is a plan view of the pendulum arm locking nut of Fig. 9;

Fig. 11 is a side elevation view, partly shown in fragment, of the pendulum mass or ball;

Fig. 12 is a plan view of the pendulum mass or ball of Fig. 11;

Fig. 13 is a bottom elevation view of the top half of the liquid level reservoir;

Fig. 14 is a side elevation view, partly shown in fragment, of the top half of the visible liquid level reservoir of Fig. 13;

Fig. 15 is a side elevation view, partly shown in fragment, of the bottom half of the visible liquid level reservoir;

2

Fig. 16 is a bottom elevation view of bottom half of the visible liquid level reservoir of Fig. 15; and Fig. 17 is a side and top elevation view of the gasket seal employed between the reservoir and the battery cell.

The device of this invention is primarily designed to be used in conjunction with the filler neck of cells of storage batteries 1 in automobiles, airplanes, boats, submarines, and other installations subject to rapid changes in speed and changes in position.

The invention comprises a substantially bottle-shaped housing, container, vessel, or reservoir, which from fabrication, production consideration of the complete combination, is necessarily in two parts, a bottom part 2 and a top part 3 having complementary annular shoulders 4 in the side walls thereof to mutually abut. The bottom 2 and top 3, thus, may be easily joined in liquid-tight relationship. Because one feature of the invention is a visible liquid level indicator, it is preferred to have these reservoir parts molded from transparent, electrolyte-resistant synthetic resin plastic, such as polystyrene and modified polystyrene resins, which parts can be sealed by local polymerization of these or other resins at the joinder of the complementary shoulders 4 to provide the complete reservoir after molding the parts.

The top member 3 of the reservoir has a neck portion 5 which has internal threads 6. This section having the internal threads 6 is preferably the same diameter and thread as the filling neck of the cell so that a series of reservoirs may be threadedly engaged to provide a reservoir of any desired capacity. A vent cap 7 having a hollow externally threaded projection 8 threadedly engaging the threads 6 of the top member 3 of the reservoir to securely but removably mount one to the other. The vent cap 7 has a vent aperture or conduit 9 provided therein and located with one end thereof centrally or concentrically positioned with respect to the hollow threaded projection 8. As illustrated, the vent conduit 9 is vertical, which is convenient and satisfactory, but it may extend in any direction, either in a straight line, arcuate, complex curve, or a combination thereof.

The bottom member 2 of the reservoir has a threaded projection 12 which engages the threads 13 in the filling neck of the battery cell 1 to mount the members together. A compressible annular seal member 15, such as a neoprene ring, impervious to battery electrolyte is employed between and compressed by the battery box 1 and the bottom member 2 of the reservoir.

The projection 12 is hollow to permit gas to escape from the battery into the reservoir and permit liquid, water or electrolyte to pass from the reservoir into the battery cell.

The vent cap 7 has suspended therefrom and cooperating therewith the non-spill mechanism which is pendulum actuated. This non-spill mechanism comprises a pendulum mass or ball 16 which is secured to a pendulum arm 17, which arm is preferably a bolt that threadedly engages a threaded recess or tap 18 in the pendulum mass 16. In this manner, the pendulum arm 17 may be adjusted in length and locked in position by means of the locking nut 19 threadedly engaging the pendulum arm 17 and abutting the pendulum mass 16. The other end of the pendulum arm 17 is secured to a vent valve member 24, arcuate on top and preferably spherical. The pendulum arm 17 is conveniently secured to the vent valve member 24 by threadedly engaging the arm 17 and the tapped section or threaded recess 25 in the vent valve member 24.

The vent cap 7 is provided with an arcuate recess 23, preferably semi-spherical and of the same arc or radius as the vent valve member 24. Adjacent the recess 23 there is provided an annular recess 20 in the interior wall of the hollow projection 8, which recess 20 defines an annular shoulder 22 terminating at the spherical recess 23. A retaining sleeve 21 in the form of a cylinder fits into the annular recess 20 and abuts the shoulder 22 positively positioning the valve member 24 in the spherical recess 23. The retaining sleeve 21 may be fastened in position in any convenient manner, such as spot fusion or polymerization or threads may be provided in the usual manner for threaded engagement of the sleeve 21 and recess 20. It is preferable to arcuate recess the inner wall of the sleeve 21 at the top to provide a smooth seat 28 for the vent valve member 24. The sleeve 21 extends into the reservoir and such extension functions as a stop for the pendulum arm 17 to prevent the pendulum mass 16 from contacting the wall of the reservoir and possibly fracturing it by impact.

A vent port or conduit 26 extends through the vent valve member 24 and terminates in a frustro-conical recess 27, whereby the vent valve member 24 will, by the registration of the vent port 26 and cap vent 9, vent until rotated by the pendulum 16 beyond a predetermined degree—experience has shown that the degree of rotation before venting terminates by the frustro-conical recess 27 failing to register with the vent port or conduit 9 in the cap 7 is preferably 20°.

In operation as a complete combination or as sub-combinations, the invention is rapid, positive, simple, and efficient. The assembled reservoir with the sealing ring 15 thereon is threadedly engaged with the filler neck of the cell of the battery 1 until the sealing ring 15 is compressed therebetween. The vent cap 7 is removed and the reservoir filled with water or electrolyte to a predetermined level (usually marked on the reservoir wall), and the vent cap 7 is then replaced. As electrolyte replacement in the cell is needed, it flows by gravity from the reservoir through the opening 30 into the cell. The liquid level is always visible unless replacement is needed. The non-spill vent valve mechanism operates to vent the cell when in normal position, i. e., within 20° of level in any and all directions. The gas generated passes through the liquid from the cell through the reservoir, the vent port 26 and frustro-conical recess 27 registering with vent 9 in the cap 7 and into the atmosphere. However, when the battery is tilted in any direction from normal level, the pendulum 16 swings under the force of gravity and rotates the vent valve member 24; and, when the vent valve 24 is rotated more than the predetermined angle of 20°, the frustro-conical recess 27 is out of register with the vent port 9 in the cap 7. Thus liquid cannot escape from the battery. Rapid changes in speed of the vehicle in which the battery is mounted effect the same result by the inertia swinging the pendulum to close the vent and prevent sloshing.

There are numerous uses of this invention as a complete combination and as individual sub-combinations, i. e., visible liquid level indicators and automatic replenishers, and non-spill vent means, wherever applicable.

Numerous changes may be made in the invention, as illustrated, without departing from the spirit and scope thereof. For example, the reservoir bottom 2 and top 3 may be threadedly engaged to form the unit; the sleeve 21 may threadedly engage the cap 7, and may be flush with the projection 8 in which design a rubber bumper is preferably secured to and around the pendulum 16; and, the vent valve may have the vent port 26 positioned in any operable position, and in fact may consist of a plurality of ports.

Also included in the scope of the invention and practical utility is a series of rings (not shown) having different side wall thicknesses and threaded both internally and externally to function as adapters so that the device may threadedly engage the filler neck of any storage battery by using the proper adapter ring. It is well known that there are four different sizes of threaded filler neck batteries; and by using the adapter rings, the device may be manufactured in only the smallest size and adapted to fit any of the larger sizes.

Having thus described the invention, what is claimed as new and desired to secure by grant of United States Letters Patent is:

1. A visible liquid level indicating non-spill vent mechanism for storage battery cells comprising a transparent reservoir threadedly connected to said battery cell, a removable cap threadedly engaging said reservoir, a semi-spherical recess provided in said cap a vent port in said cap, a spherical vent valve positioned in said cap recess, a vent port normally registering with said reservoir and extending through said vent valve and terminating in an enlarged port registering with said vent port in said cap, sleeve means fastened to said semi-spherical recess and positively positioning said vent valve and forming a seat therefor, and pendulum actuated means rotating said vent valve to position said ports in register and out of register.

2. In combination with the threaded filler neck of a storage battery, a non-spill mechanism comprising a hollow housing threadedly engaging said filler neck, a cap threadedly engaging said housing, a semi-spherical recess provided in said cap a vent port in said cap, a spherical vent valve rotatably mounted in said cap recess, a sleeve secured to said cap and forming a seat for said valve, a vent port normally registering with said vent port in said cap, and a pendulum rigidly secured to said vent valve and rotating said vent valve to position said ports in register and out of register.

3. In combination with a storage battery embodying a casing having a threaded filler neck, a reservoir having a threaded neck engaging said filler neck, a filler neck in said reservoir, internal threads in said reservoir filler neck of the same size and thread as said battery filler neck a vent cap for said reservoir filler neck, an arcuate recess provided in said cap and an adjustable pendulum actuated non-spill vent valve mechanism rotatably positioned in said recess and supported by said vent cap; said mechanism comprising an arcuate member, a vent port through said arcuate member normally registering with a vent port in said vent cap, a pendulum arm secured to said arcuate member, a pendulum mass secured to said arm, and a sleeve member surrounding said arm and fastened to the walls of said arcuate recess and supporting said arcuate member.

4. A visible liquid level indicating non-spill vent mechanism for storage battery cells having threaded filler necks comprising a transparent reservoir having a threaded neck engaging said filler neck, a threaded filler neck in said reservoir, a vent cap threadedly engaging said reservoir filler neck, a semi-spherical recess provided in said cap, an annular recess in said cap adjacent said semi-spherical recess, a pendulum actuated spherical vent valve positioned in and supported by said vent cap, and sleeve means secured to said cap seating said valve and providing stop means for said pendulum actuated vent valve.

5. In combination with the threaded filler neck of a storage battery cell, a non-spill vent mechanism comprising a housing threadedly engaging said filler neck, a cap threadedly engaging said housing, a vent port in said cap, a semi-spherical recess in said cap communicating with said vent port, an annular recess terminating in a shoulder adjacent said semi-spherical recess, a spherical vent valve rotatable mounted in said recess and having a vent port normally registering with said cap vent port, sleeve means fastened to said cap forming a seat for said valve and a pendulum rigidly secured to said vent valve and rotating said vent valve to position said ports in register to vent in normal position and out of register to close said ports and prevent venting and spilling in abnormal position; said housing, cap and pendulum being so constructed and arranged that said valve and pendulum are removed from the housing with said cap.

6. A visible liquid level indicating non-spill vent mechanism for storage battery cells having internally threaded filler necks, comprising a transparent reservoir, an externally threaded projection threadedly engaging said battery filler neck, an internally threaded filler neck in said reservoir of the same size and thread as said threaded projection, a cap threadedly engaging said reservoir filler neck, a vent port in said cap, a semi-spherical recess in said cap communicating with said vent port therein, a spherical vent valve rotatably mounted in said recess and having a vent port normally registering with said reservoir and said cap vent port, sleeve means fastened to said cap and forming a seat for said valve, a pendulum rotating said vent valve to position said ports in register and out of register, and an adjustable pendulum arm.

ROBERT CECIL CASTLEN.

References Cited in the file of this patent

UNITED STATES PATENTS

| Number | Name | Date |
|---|---|---|
| 1,447,797 | Loudon | Mar. 6, 1923 |
| 1,942,630 | Woodbridge | Jan. 9, 1934 |
| 2,055,645 | Allen | Sept. 29, 1936 |
| 2,082,605 | Woodbridge | June 1, 1937 |
| 2,092,214 | Janko | Sept. 7, 1937 |
| 2,324,999 | Shinn | July 20, 1943 |
| 2,343,663 | Gregory | Mar. 7, 1944 |
| 2,351,177 | Younkman | June 13, 1944 |

FOREIGN PATENTS

| Number | Country | Date |
|---|---|---|
| 810,291 | France | Dec. 28, 1936 |
| 551,867 | Great Britain | Mar. 12, 1943 |
| 118,834 | Australia | Aug. 16, 1944 |